UNITED STATES PATENT OFFICE.

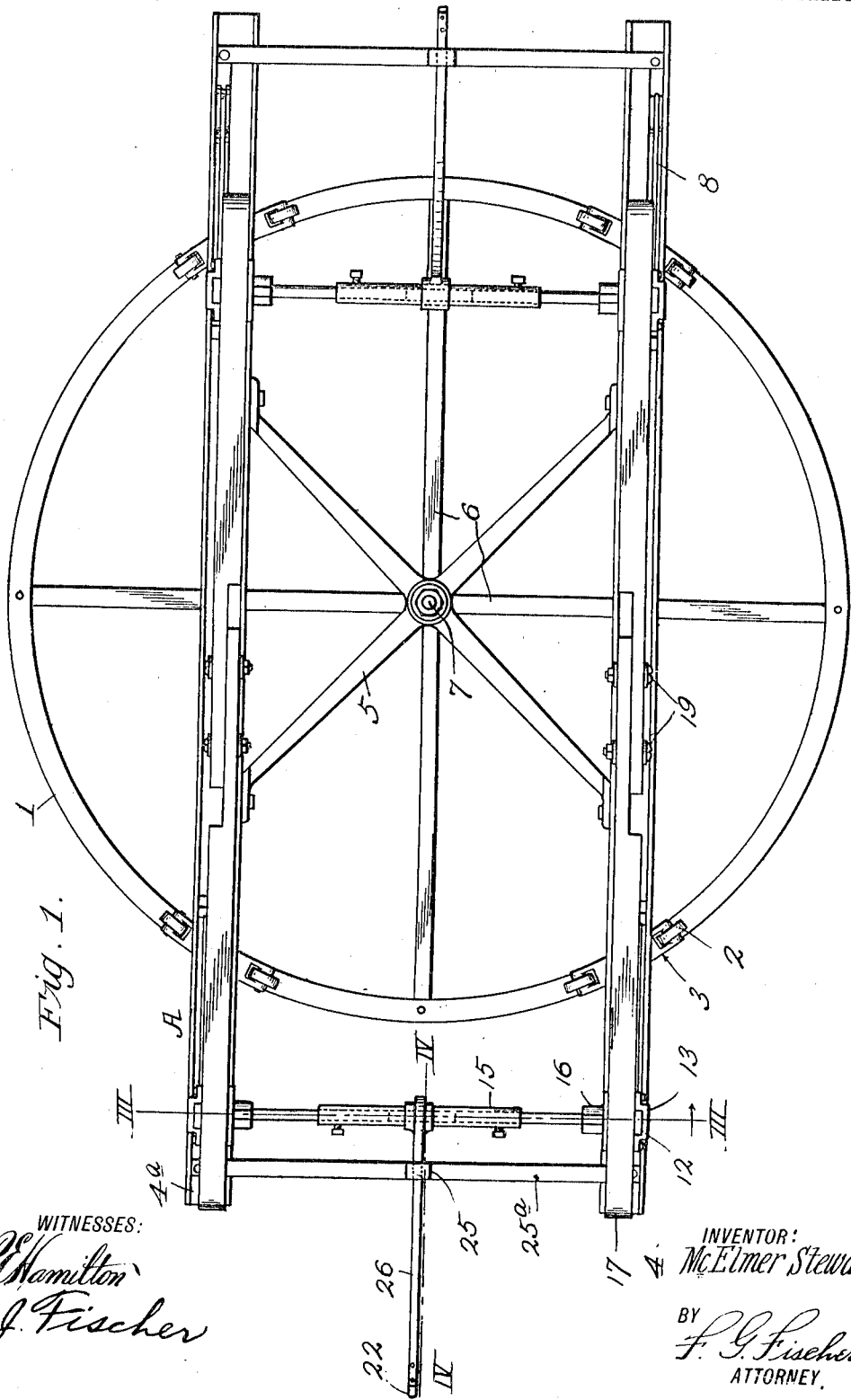

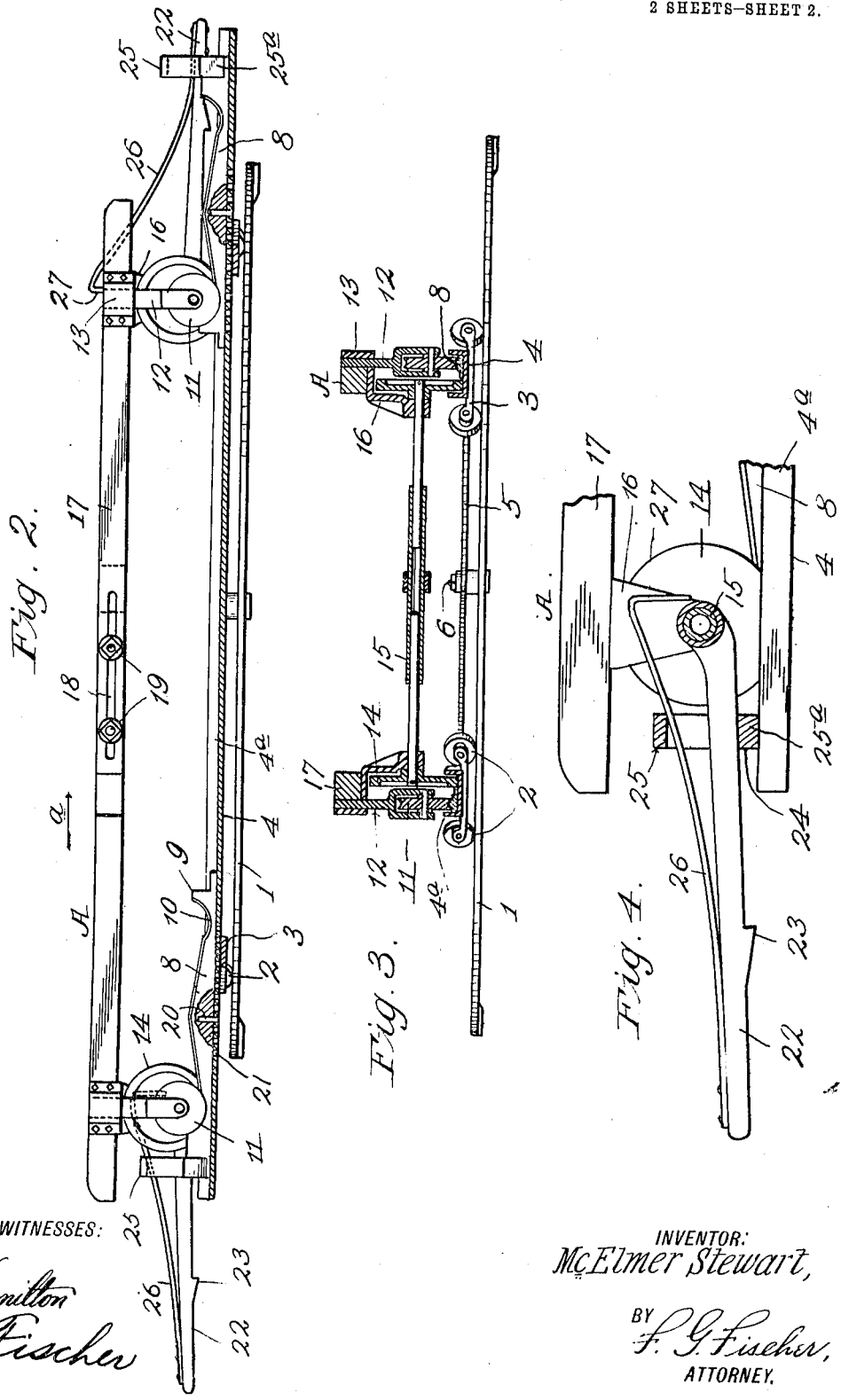

McELMER STEWART, OF KANSAS CITY, MISSOURI, ASSIGNOR, BY DIRECT AND MESNE ASSIGNMENTS, TO AUTOMATIC TIRE REST COMPANY, OF KANSAS CITY, MISSOURI, A CORPORATION.

MEANS FOR LIFTING AND TURNING AUTOMOBILES.

1,080,384.      Specification of Letters Patent.      Patented Dec. 2, 1913.

Application filed April 28, 1913. Serial No. 764,029.

*To all whom it may concern:*

Be it known that I, McELMER STEWART, a citizen of the United States, residing at Kansas City, in the county of Jackson and State of Missouri, have invented certain new and useful Improvements in Means for Lifting and Turning Automobiles, of which the following is a specification.

My invention relates to improvements in means for lifting and turning automobiles, and one object is to provide a simple apparatus of this character whereby the life of automobile tires may be prolonged by relieving them of the weight of the automobile while the same is at rest.

A further object is to provide means whereby the automobile may be turned around to any desired point.

The apparatus is intended more especially for use in public and private garages, although it may be used to advantage in repair shops and other places.

In order that the invention may be fully understood, reference will now be made to the accompanying drawings, in which:

Figure 1 is a plan view of the apparatus. Fig. 2 is a side elevation partly in section. Fig. 3 is a cross section on line III—III of Fig. 1, with some of the parts in the background removed. Fig. 4 is a section, enlarged, on line IV—IV of Fig. 1.

In carrying out the invention, I employ a turntable consisting of an annular rail 1, wheels 2 mounted upon said rail and united in pairs by yokes 3, a track 4 consisting of a pair of channel-bars, 4ª mounted upon said yokes 3, a spider 5 uniting said channel-bars 4ª, arms 6 intersecting at their central portions and secured at their ends to rail 1, and a king-bolt 7 extending through the central portions of spider 5 and arms 6, and constituting the axis of the turntable.

The means for raising the automobile embodies four rails 8, the upper surfaces of which are inclined in opposite directions from a point midway between their ends 9, which extend upwardly as shown on Fig. 2 to limit the movement of a four-wheeled truck A. The upper surfaces of rails 8 have recesses 10, adjacent the ends 9, to receive rollers 11 arranged to traverse said rails, one roller being mounted upon each rail.

Rollers 11 are grooved to fit the cross-sectional curvature of the rails 8, the flanges thus formed at the opposite sides of the grooves serving to hold the rollers from lateral displacement from their respective rails 8.

12 designates a plurality of standards, one of which is mounted upon each roller 11 and extends upward through a guide 13, one of which is fixed near each corner of the truck A. Standards 12 are disposed to engage the undersides of the axles of an automobile preparatory to lifting the same. Said truck comprises four wheels 14, telescopic shafts 15 upon which said wheels 14 are mounted, brackets 16, in which shafts 15 are mounted, and longitudinal members 17 connecting the brackets 16 in pairs and carrying the guides 13.

Each longitudinal member 17 is made in two pieces having longitudinal slots 18 for the passage of bolts 19, whereby the two pieces of each member 17 are connected. This arrangement permits the standards 12 to be adjusted toward or away from each other to accommodate automobiles of different lengths.

The lengthening or shortening of truck A adjusts the rollers 11 toward or away from each other, so I provide rails 8 with depending dowel pins 20, adapted to take into any of the holes 21 in the channel-bars 4ª, in order that proper relations may be maintained between the rollers and said rails.

The rails 8 are arranged against the outer flanges of the channel-bars 4ª to leave room for the wheels 14 (see Fig. 3) to traverse said channel-bars.

22 designates a pair of latch-bars, each pivotally-mounted at one end upon a telescopic shaft 15 and provided at its underside with a shoulder 23.

Shoulders 23 are adapted to engage the lower sides 24 of loops 25, mounted upon stays 25ª extending transversely across the ends of the turntable and connected at their terminals to the rails 8.

26 designates a pair of springs, each connected to the free end of a latch-bar 22 and extending backward through the adjacent loop 25, is bent downward to form an abutment 27, which, when in raised position as shown at the right on Fig. 2, is disposed in line with two of the vertical edges of the adjacent standards 12, to abut the front axle of the automobile when said axle is immediately over said standards.

The operation of the apparatus is substantially as follows: As shown on Figs. 1 and 2, the apparatus is adjusted to receive an automobile traveling in the direction of arrow *a*. As the automobile passes over the truck its front axle contacts the abutment 27 at the right of the apparatus and thereby pushes said truck forward until the shoulder on the latch-bar 22, at the left engages the lower portion 24 of its respective loop 25, the parts being so arranged that such engagement takes place just as rollers 11 which have been carried by the rails 8, start to descend the other side of said rails. The traveling of rollers 11 up the rails 8, pushes the standards 12 upward through the guides 13, causing said standards to engage the undersides of the axles of the automobile, which is thereby raised until its tires clear the floor, thus relieving said tires of all weight. To allow the automobile to descend it is only necessary to lift the latch-bar 22, at the left, until its shoulder 23 disengages the lower portion of its respective loop 25, when the weight of the automobile causes rollers 11 to descend the inclined surfaces at the right of rails 8, until said rollers contact the upturned ends 9. On or before the rollers 11 pass into the recesses 10, at the right, the standards 12 pass down out of engagement with the axles and permit the tires to rest upon the floor. As truck A is carried forward by the standards 12, it pushes the latch-bar 22, at the right, forward through its respective loop 25, the upper portion of which depresses spring 26 until its abutment 27 passes down out of the path of the front axles, so that the automobile will be free to move forward after its tires reach the floor. The forward movement of the truck A draws the latch-bar 22 at the left through its respective loop 25 and permits its spring 26 to move upward until its abutment 27 is in the path of the front axle when the automobile returns in a direction opposite to that indicated by arrow *a*. If the automobile is to approach from the same direction each time, the turntable is rotated a half revolution to bring the parts in proper position.

Having thus described my invention, what I claim and desire to secure by Letters Patent, is:

1. In an apparatus of the character described, a plurality of rails each having an upper surface inclined in opposite directions from a point intermediate its ends, rollers to traverse said rails, and means carried by said rollers and adapted to lift an automobile.

2. In an apparatus of the character described, a plurality of rails having inclined surfaces and raised terminals, rollers to traverse said rails and contact the raised terminals thereof, means carried by said rollers to lift an automobile, and means to check said rollers when the automobile is in raised position.

3. In an apparatus of the character described, a plurality of rails having surfaces inclined in opposite directions from a point intermediate their ends, rollers to traverse said inclined surfaces, standards carried by said rollers to engage the axles of an automobile to lift the same, an abutment adjacent said standards to hold the same in proper relation to the axles and actuate the rollers, said abutment being arranged in the path of the front axle, and means to check the rollers immediately after they have passed the apex of the inclined surfaces.

4. In an apparatus of the character described, means for raising an automobile, a truck for actuating said means, an abutment on said truck arranged in the path of the automobile, whereby said truck is moved forward with the automobile, and means to check the forward movement of said truck.

5. In an apparatus of the character described, lifting means for lifting an automobile, a truck to control said lifting means, latch-bars at the ends of said truck to limit the movement thereof, means to check the movement of said latch-bars, and abutments carried by said latch-bars, either one of said abutments being adapted to be arranged in the path of the automobile so that the truck will be actuated thereby.

6. In an apparatus of the character described, means for raising an automobile, a truck for actuating said means, an abutment on said truck and in the path of the automobile, whereby said truck is moved forward with the automobile, means to check the truck before completing its forward movement, and means to lower the abutment out of the path of the automobile as the truck completes its forward movement.

7. In an apparatus of the character described, means for raising an automobile, a truck for actuating said means, an abutment in the path of the automobile, whereby said truck is moved forward with the automobile, an element carrying said abutment, a latch-bar carrying said element and adapted to check the truck before completing its forward movement, and means coacting with said latch-bar to check the truck and with the element to move the abutment out of the path of the automobile as the truck completes its forward movement.

8. In an apparatus of the character described, means for raising an automobile, a truck for actuating said means, an abutment in the path of the automobile, whereby said truck is moved forward with the automobile, a spring carrying said abutment, an element carrying said spring, and a stationary loop coacting with said element to check the truck and with the spring to move the abutment out of the path of the automobile as the truck completes its forward movement.

9. In an apparatus of the character described, means for raising an automobile, and a truck for actuating said means and adapted to be actuated by the automobile, consisting of wheels, shafts upon which said wheels are mounted, brackets mounted upon said shafts and adjustably connected so that said truck may be lengthened or shortened.

10. In an apparatus of the character described, two channel-bars, rails adjustably mounted upon said channel-bars and having inclined surfaces, rollers to traverse said rails, means carried by said rollers to raise an automobile, and a truck for actuating the rollers and adapted to be actuated by the automobile, consisting of wheels to traverse the channel-bars, shafts upon which said wheels are mounted, brackets mounted upon said shafts, and longitudinal members mounted upon said brackets and adjustably connected so that said truck may be lengthened or shortened.

11. In an apparatus of the character described, a plurality of rails having inclined surfaces, rollers to traverse said rails, means carried by said rollers and adapted to engage the underside of an automobile and lift the same to relieve the tires thereof of the weight of the automobile, means connecting the rails in pairs, rollers carrying said means, and a circular track traversed by said rollers.

In testimony whereof I affix my signature. in the presence of two witnesses.

McELMER STEWART.

Witnesses:
F. G. FISCHER,
L. J. FISCHER.